(12) United States Patent
Jeong et al.

(10) Patent No.: US 8,497,817 B2
(45) Date of Patent: Jul. 30, 2013

(54) STEREOSCOPIC IMAGE DISPLAY PANEL AND STEREOSCOPIC IMAGE DISPLAY DEVICE INCLUDING THE SAME

(75) Inventors: Il Gi Jeong, Chungcheongbuk-do (KR); Su Woong Lee, Gyeonggi-do (KR); Nam Yong Gong, Gyeonggi-do (KR); Chong Hun Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 268 days.

(21) Appl. No.: 13/150,722

(22) Filed: Jun. 1, 2011

(65) Prior Publication Data
US 2012/0306935 A1    Dec. 6, 2012

(51) Int. Cl.
*G09G 5/00* (2006.01)

(52) U.S. Cl.
USPC .................................................. 345/6; 349/15

(58) Field of Classification Search
USPC .................................................. 345/6; 349/15
See application file for complete search history.

(56) References Cited

U.S. PATENT DOCUMENTS

| | | | |
|---|---|---|---|
| 6,151,062 A * | 11/2000 | Inoguchi et al. | 348/51 |
| 7,892,728 B2 * | 2/2011 | Moriyama et al. | 435/4 |
| 2006/0050016 A1 * | 3/2006 | Tomisawa et al. | 345/32 |
| 2007/0229654 A1 * | 10/2007 | Kusuno | 348/51 |

FOREIGN PATENT DOCUMENTS

| | | | |
|---|---|---|---|
| JP | 2007-108501 A | 4/2007 | |
| KR | 2008-0000917 A | 1/2008 | |

* cited by examiner

*Primary Examiner* — Kevin M Nguyen
(74) *Attorney, Agent, or Firm* — Morgan, Lewis & Bockius LLP

(57) ABSTRACT

Disclosed is a stereoscopic image display panel and a stereoscopic image display device including the same, which minimize the degradation of image quality due to crosstalk between left and right images discerned by a viewer, and have enhanced brightness and aperture ratio, wherein the stereoscopic image display panel comprises a first substrate including a plurality of data lines formed at certain intervals apart, a plurality of gate lines formed to intersect the data lines, and first and second pixel groups formed adjacently to each other with two adjacent gate lines therebetween; and a second substrate including a light shield layer formed at one side and other side of each of the first and second pixel groups to have different overlapped widths, and defining an open area of each of the first and second pixel groups, wherein the first and second pixel groups display different stereoscopic images, respectively.

19 Claims, 4 Drawing Sheets

STEREOSCOPIC IMAGE DISPLAY PANEL AND STEREOSCOPIC IMAGE DISPLAY DEVICE INCLUDING THE SAME

BACKGROUND OF THE INVENTION

1. Field of the Invention

The present invention relates to a stereoscopic image display device, and more particularly, to a stereoscopic image display panel and a stereoscopic image display device including the same, which minimize the degradation of image quality due to crosstalk between left and right images discerned by a viewer, and have enhanced brightness and aperture ratio.

2. Discussion of the Related Art

With the advance of information society, enlarging and thinning of display devices are being required in the market. Due to such requirements, there is the explosive increase in demand on various types of flat panel display devices that are thin, light, and have a low consumption power.

As flat panel display devices, there are liquid crystal display devices (LCDs), plasma display panels (PDPs), field emission display devices (FEDs), and light-emitting diode display devices (LEDs) that are actively being researched. Among such flat panel display devices, however, LCDs are widely used owing to various advantages, for example, technical development for the mass production, easiness in the structures and driving of drivers, low power consumption, and realization of a high-quality image.

Recently, a stereoscopic image display device that enables a viewer to view a three-dimensional (3D) image having three-dimensionality in a two-dimensional (2D) image displayed therein is being developed.

A stereoscopic image display device separates an image into left and right images having binocular parallax to display the left image for a viewer's left eye and the right image for the viewer's right eye. That is, the stereoscopic image display device allows the left image to be discerned only by the viewer's left eye and allows the right image to be discerned only by the viewer's right eye, thereby enabling the viewer to view a 3D image having three-dimensionality.

In stereoscopic image display devices of the related art, however, a case occurs where a left image is discerned by a viewer's right eye or a right image is discerned by the viewer's left eye, in spite of that the left image is required to be discerned only by the viewer's left eye and the right image is required to be discerned only by the viewer's right eye. Stereoscopic image display devices of the related art have limitations in that image quality is degraded due to crosstalk between a left image and a right image.

SUMMARY OF THE INVENTION

Accordingly, the present invention is directed to provide a stereoscopic image display panel and a stereoscopic image display device including the same, which minimize the degradation of image quality due to crosstalk between left and right images discerned by a viewer, and have enhanced brightness and aperture ratio.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a stereoscopic image display panel including: a first substrate including a plurality of data lines formed at certain intervals apart, a plurality of gate lines formed to intersect the data lines, and first and second pixel groups formed adjacently to each other with two adjacent gate lines therebetween; and a second substrate including a light shield layer formed at one side and other side of each of the first and second pixel groups to have different overlapped widths, and defining an open area of each of the first and second pixel groups, wherein the first and second pixel groups display different stereoscopic images, respectively.

The light shield layer may include: a first light shield layer formed to cover an edge of the second substrate; a second light shield layer formed to cover the data line; a third light shield layer formed to have a first width and cover one side of each of the first and second pixel groups adjacent to the gate line and the two adjacent gate lines; and a fourth light shield layer formed in parallel to the third light shield layer to have a second width narrower than the first width, and covering the other side of each of the first and second pixel groups.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

Figure 1:
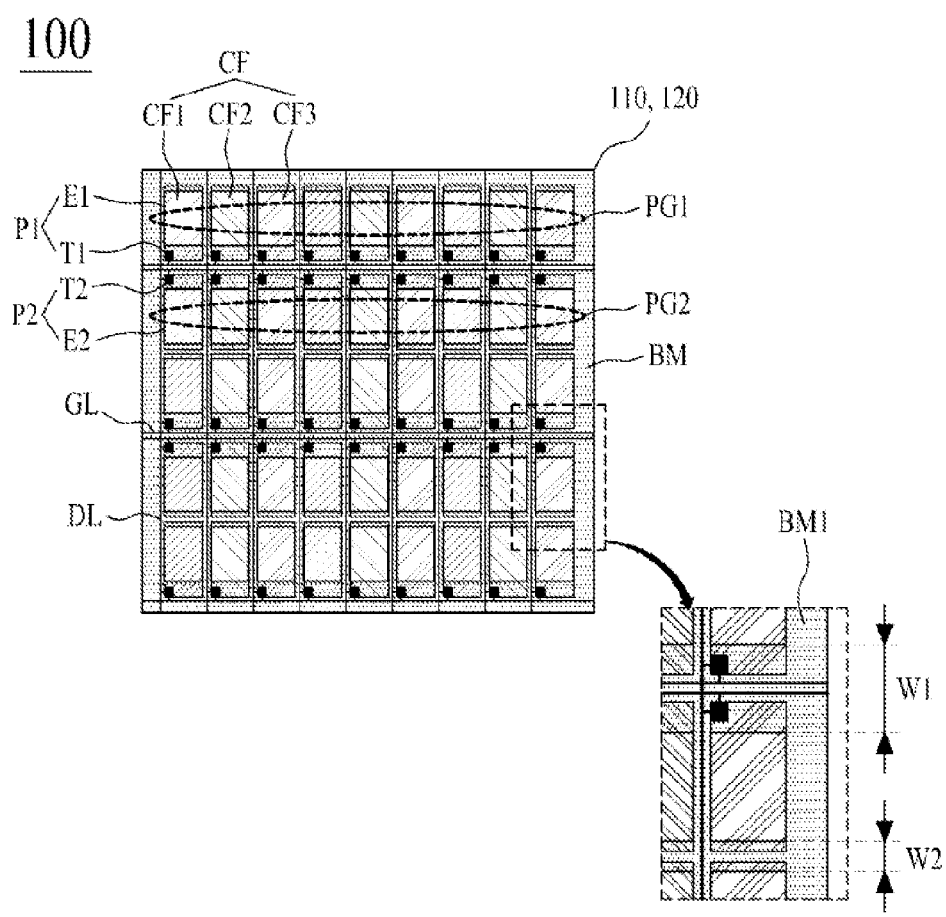
FIG. 1 is a plan view illustrating a stereoscopic image display panel according to an embodiment of the present invention.
Figure 2:
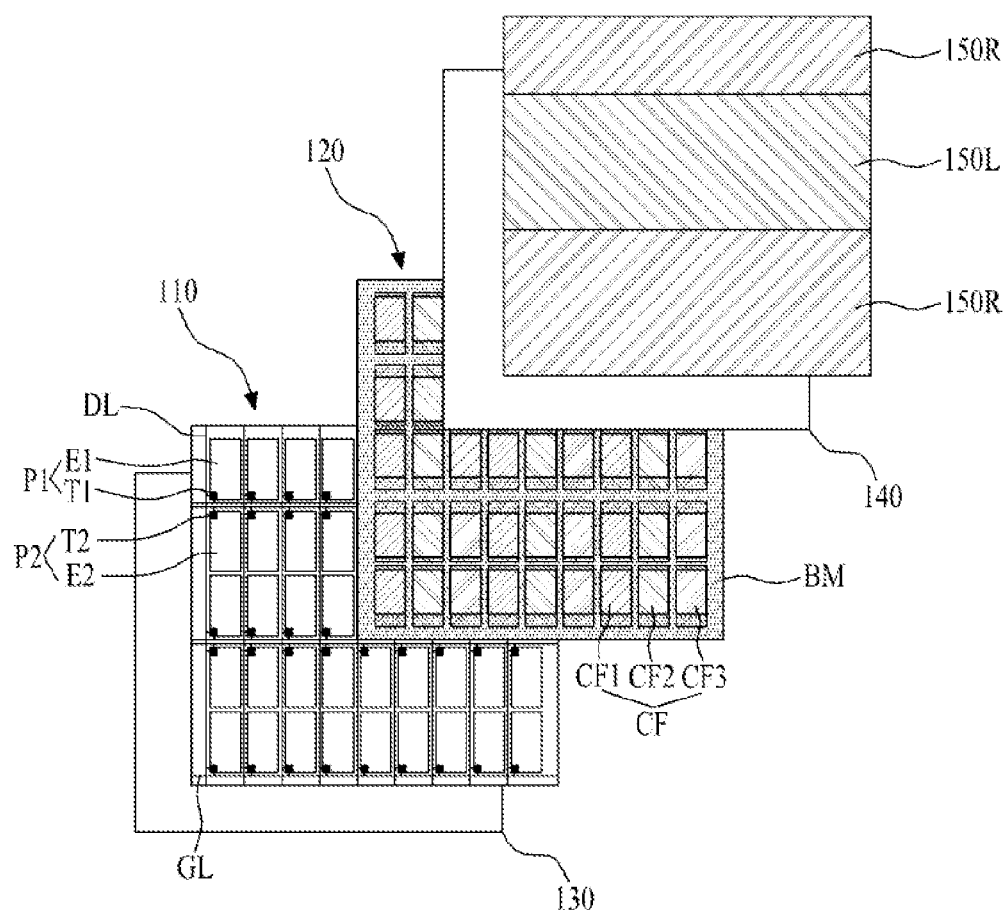
FIG. 2 is an exploded perspective view illustrating a portion of the stereoscopic image display panel of FIG. 1.

FIG. 1 is a plan view illustrating a stereoscopic image display panel according to an embodiment of the present invention. FIG. 2 is an exploded perspective view illustrating a portion of the stereoscopic image display panel of FIG. 1.

Referring to FIGS. 1 and 2, a plan view illustrating a stereoscopic image display panel 100 according to an embodiment of the present invention includes first and second substrates 110 and 120, first and second polarizers 130 and 140, first and second optical axis changing members 150R and 150L.

The first and second substrates 110 are coupled to face each other with a liquid crystal layer (not shown) therebetween. The first substrate 110 drives the liquid crystal layer to control transmittance of light that is irradiated from a backlight unit (not shown) and passes through the liquid crystal layer. For this, the first substrate 110 includes a plurality of data lines DL, a plurality of gate lines GL, and first and second pixel groups PG1 and PG2.

The data lines DL are formed at certain intervals, on the first substrate 110. A first image for 3D display or a second image for 3D display is supplied to the data lines DL according to driving of the gate lines GL. Herein, the first image for 3D display becomes a right image discerned by a viewer's right eye, and the second image for 3D display becomes a left image discerned by the viewer's left eye. In this case, the first image for 3D display may be discerned by the viewer's right eye with glasses for 3D image, and the second image for 3D display may be discerned by the viewer's left eye with the glasses for 3D image. In description below, the first image for 3D display is defined as a right image, and the second image for 3D display is defined as a left image.

Figure 3:
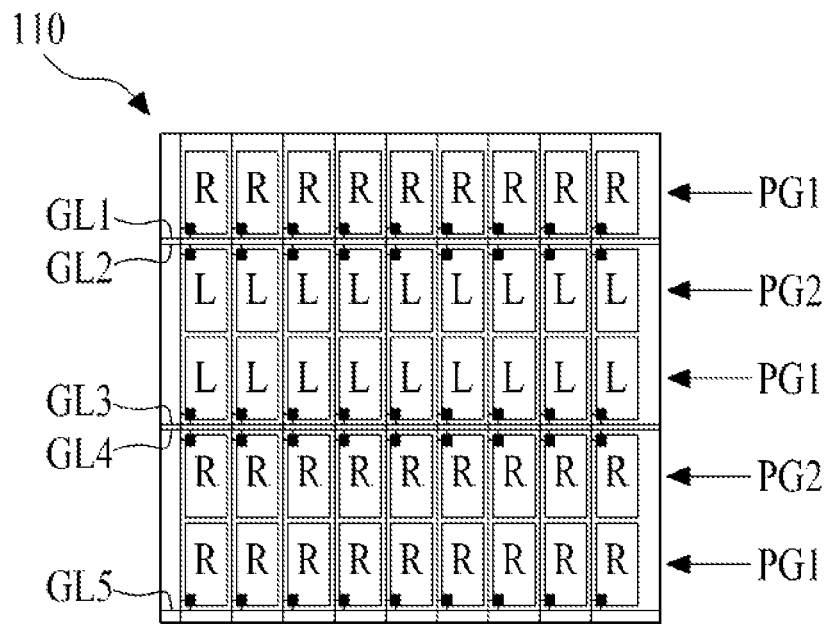
FIG. 3 is a view illustrating right and left images which are displayed in first and second pixel groups of FIGS. 1 and 2.

The gate lines GL are formed on the first substrate 110 to perpendicularly intersect the data lines DL. A gate signal is supplied to the gate lines GL. Herein, an odd-numbered gate line GL and an even-numbered gate line GL are formed adjacently to each other, but the even-numbered gate line GL and a next odd-numbered gate line GL are separated from each other by a certain interval. For example, as illustrated in FIG. 3, a first gate line GL1 and a second gate line GL2 are formed adjacently to each other, but the second gate line GL2 and a third gate line GL3 are separated from each other by a certain interval.

A first pixel group PG1 includes a plurality of first pixels P1 formed in respective pixel areas that are defined by an odd-numbered gate line GL and the data lines DL.

Each of the first pixels P1 includes a first thin film transistor T1, and a first pixel electrode E1.

The first thin film transistor T1 are connected to an odd-numbered gate line GL and the data lines DL. The first thin film transistor T1 supplies a right image signal or a left image signal, which is supplied to each of the data lines DL, to the first pixel electrode E1 in response to a gate signal supplied to the odd-numbered gate line GL.

The first pixel electrode E1 is formed to be connected to the first thin film transistor T1, in a pixel area. The first pixel electrode E1 drives a liquid crystal layer in a corresponding area according to a difference voltage between the right image or the left image signal, which is supplied through the first thin film transistor T1, and a common voltage that is supplied to a common electrode (not shown) formed on the second substrate 120.

The common electrode may be formed in parallel to the first pixel electrode E1, in a pixel area of the first substrate 110. Herein, the first pixel electrode E1 and the common electrode may be formed to have a l-shape or a fingers shape that is divided in plurality and to be separated from each other by a certain interval.

The second pixel group PG2 includes a plurality of second pixels P2 formed in respective pixel areas that are defined by an even-numbered gate line GL and the data lines DL.

Each of the second pixels P2 includes a second thin film transistor T2, and a second pixel electrode E2.

The second thin film transistor T2 are connected to an even-numbered gate line GL and the data lines DL. The second thin film transistor T2 supplies a right image signal or a left image signal, which is supplied to each of the data lines DL, to the second pixel electrode E2 in response to a gate signal supplied to the even-numbered gate line GL.

The second pixel electrode E2 is formed to be connected to the second thin film transistor T2, in a pixel area. The second pixel electrode E2 drives a liquid crystal layer in a corresponding area according to a difference voltage between the right image or the left image signal, which is supplied through the second thin film transistor T2, and the common voltage that is supplied to the common electrode (not shown) formed on the second substrate 120.

The common electrode may be formed in parallel to the second pixel electrode E2, in a pixel area of the first substrate 110. Herein, the second pixel electrode E2 and the common electrode may be formed to have a l-shape or a fingers shape that is divided in plurality and to be separated from each other by a certain interval.

The first and second pixel groups PG1 and PG2, as illustrated in FIG. 3, display different 3D images, respectively. Specifically, first and second pixel groups PG1 and PG2, which are adjacently formed along direction of a data line DL with two adjacent gate lines GL1 and GL2 and two adjacent gate lines GL3 and GL4 therebetween, display different 3D images (i.e., a right image R and a left image L), respectively. Second and first pixel groups PG2 and PG1, which are adjacently formed along direction of a data line DL with two separated gate lines GL2 and GL3 and two separated gate lines GL4 and GL5 therebetween, display the same 3D image (for example, a right image R or a left image L).

For example, a first pixel group PG1 connected to a first gate line GL1 displays a right image R. A second pixel group PG2 connected to a second gate line GL2 displays a left image L. A first pixel group PG1 connected to a third gate line GL3 displays a left image L. A second pixel group PG2 connected to a fourth gate line GL4 displays a right image R. A first pixel group PG1 connected to a fifth gate line GL5 displays a right image R.

Figure 4:
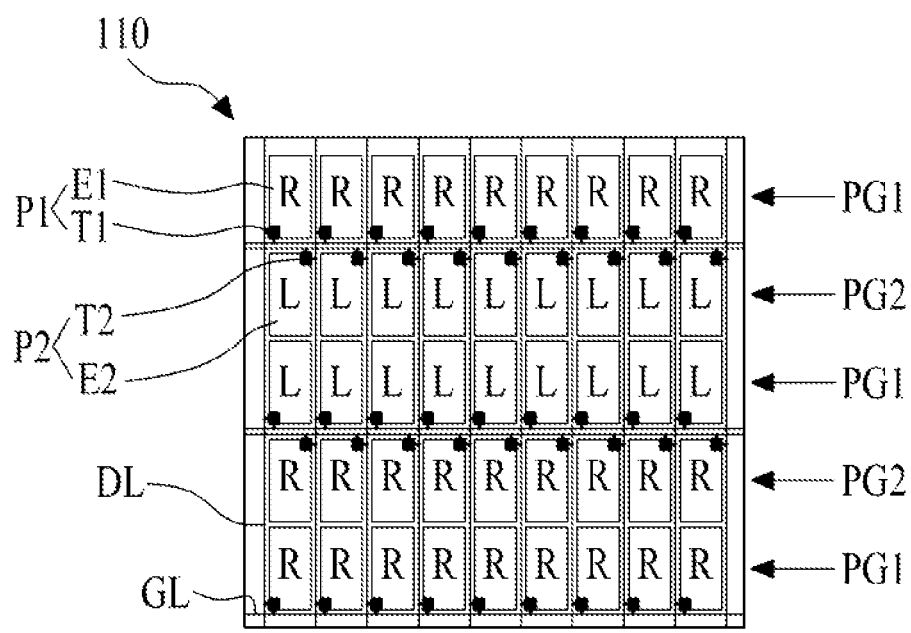
FIG. 4 is a view illustrating another embodiment of a disposition structure of a thin film transistor which is formed on a first substrate of FIGS. 1 and 2.

The first and second transistors T1 and T2 that are respectively formed in the first and second pixel groups PG1 and PG2, as illustrated in FIG. 4, may be disposed between two adjacent data lines DL along direction of the data line DL in a zigzag shape. In this case, one data line DL is further formed.

In this way, when the first and second transistors T1 and T2 that are respectively formed in the first and second pixel groups PG1 and PG2 are disposed in a zigzag shape, the present invention inverts polarity of a right image signal or left image signal, which is supplied to a data line DL, per data line and thus may drive a right image R and a left image L, which are displayed in the respective pixels P1 and P2 formed on the first substrate 110, in a dot inversion scheme. Accordingly, the present invention realizes the dot inversion scheme with a column inversion scheme, and thus can reduce a consumption power and enhance image quality.

In FIGS. 1 and 2, the first and second substrates 110 and 120 are coupled to face each other with the liquid crystal layer (not shown) therebetween. The second substrate 120 filters light, which is irradiated from the backlight unit and passes through the liquid crystal layer, to emit color light and thus displays a certain color 3D image. For this, the second substrate 120 includes a color filter CF and a light shield layer BM.

The color filter CF includes a red color filter CF1, a green color filter CF2 and a blue color filter CF3, which are formed in correspondence with each of the first and second pixel groups PG1 and PG2. Herein, the red color filter CF1, the green color filter CF2 and the blue color filter CF3 are alternated in order along a longitudinal direction of a gate line GL, and identically alternated along a longitudinal direction of a data line DL. The red color filter CF1, the green color filter CF2 and the blue color filter CF3 form one unit pixel, which displays a certain color 3D image with light that is emitted through the color filters CF1 to CF3.

Figure 5:
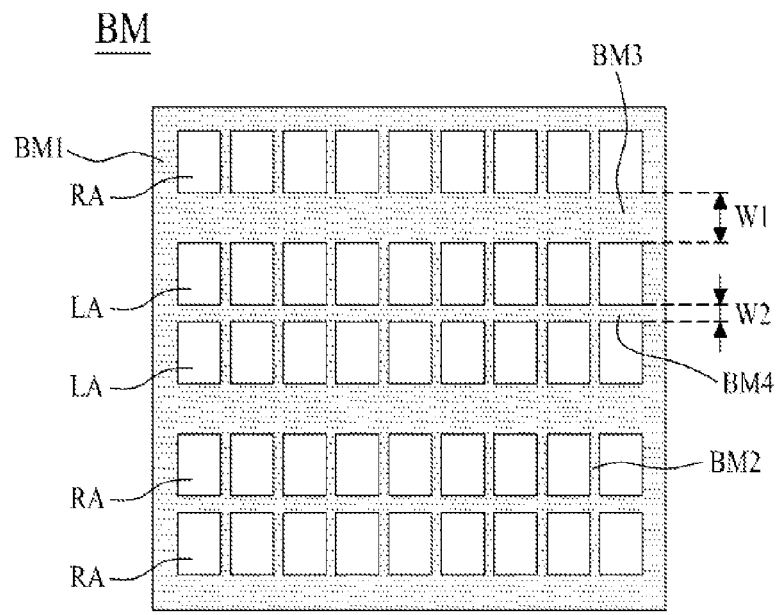
FIG. 5 is a view illustrating a light shield layer of FIGS. 1 and 2.

The light shield layer BM defines a pixel area by dividing a plurality of color filters CF formed on the second substrate 120. Furthermore, the light shield layer BM is formed to have different overlapped widths at one side and other side of each of the color filters CF and thus defines an open area in each of the first and second pixel groups PG1 and PG2. For this, as illustrated in FIG. 5, the light shield layer BM may be defined as first to fourth light shield layers BM1 to BM4 according to positions formed on the second substrate 120.

The first light shield layer BM1 is formed to cover an edge (or frame) of the second substrate 120.

The second light shield layer BM2 is formed to cover the data lines DL formed on the first substrate 110. In this case, the second light shield layer BM2 is formed to be connected to an upper portion and lower portion of the first light shield layer BM1. Herein, the second light shield layer BM2 may be formed to partially overlap with both sides of each of the first and second pixel groups PG1 and PG2 adjacent to each of the data lines DL.

The third light shield layer BM3 having a first width W1 is formed to cover two adjacent gate lines GL, the thin film transistor T1 of the first pixel group PG1, one sides of the color filters CF of the first pixel group PG1, the thin film transistor T2 of the second pixel group PG2, and one sides of the color filters CF of the second pixel group PG2. Herein, the third light shield layer BM3 is formed to be connected to the left and right of the first light shield layer BM1.

The fourth light shield layer BM4 having a second width W2 narrower than the first width W1 is formed between the third light shield layers BM3 to cover a gap between color filters CF formed between two adjacent gate lines GL and other sides of the color filters CF, along a longitudinal direction of a data line DL. Herein, the fourth light shield layer BM4 is formed to be connected to the left and right of the first light shield layer BM1.

A right open area RA and a left open area LA, which transmit color light corresponding to right and left images displayed in the first and second pixel groups PG1 and PG2, are formed on the second substrate 120 due to the light shield layer BM including the first to fourth light shield layers BM1 to BM4.

In FIG. 2, a first polarizer 130 is formed in a rear surface (i.e., a surface facing the backlight unit) of the first substrate 110 to polarize light that is irradiated from the backlight unit to the first substrate 110.

A second polarizer 140 is formed in a front surface (i.e., an outer surface) of the second substrate 120 to polarize light that passes through the second substrate 120 and is emitted to the outside.

The first light-axis changing member 150R is formed to cover the first pixel group PG1 and/or second pixel group PG2 displaying a right image, and changes the axis of color light, which passes through the right open area RA, to provide the right image to a viewer's right eye.

The second light-axis changing member 150L is formed to cover the first pixel group PG1 and/or second pixel group PG2 displaying a left image, and changes the axis of color light, which passes through the left open area LA, to provide the left image to a viewer's left eye. Herein, the second light-axis changing member 150L is formed between the first light-axis changing members 150R.

The first and second light-axis changing members 150R and 150L may be directly formed at a surface of the second polarizer 140, or formed on a film or a substrate (for example, a glass substrate, or a plastic substrate) to be disposed on the second polarizer 140.

In the stereoscopic image display panel 100 according an embodiment of the present invention, the first and second pixel groups PG1 and PG2 are formed to be vertically adjacent to each other with two gate lines GL therebetween, and the third and fourth light shield layers BM3 and BM4 having different widths are formed to cover one side and other side of each of the first and second pixel groups PG1 and PG2 at different widths. Accordingly, the degradation of image quality due to crosstalk between the right image R and the left image L can be minimized, and the open areas RA and LA are increased by the third and fourth light shield layers BM3 and BM4 having different widths, thereby enhancing brightness and an aperture ratio.

That is, the stereoscopic image display panel 100 displays different 3D images R and L in the first and second pixel groups PG1 and PG2 that are formed to be vertically adjacent to each other with two gate lines GL therebetween, and separates the different 3D images R and L with the third light shield layer BM3 having a relatively broader width, thereby minimizing the degradation of image quality due to crosstalk between the right image R and the left image L.

Moreover, the stereoscopic image display panel 100 displays the same 3D image R and L in the first and second pixel groups PG1 and PG2 that are vertically and adjacently formed between two separated gate lines GL, and separates the same 3D image R and L with the fourth light shield layer BM4 having a relatively narrower width, thereby increasing the open areas RA and LA and thus enhancing brightness and an aperture ratio.

Figure 6:
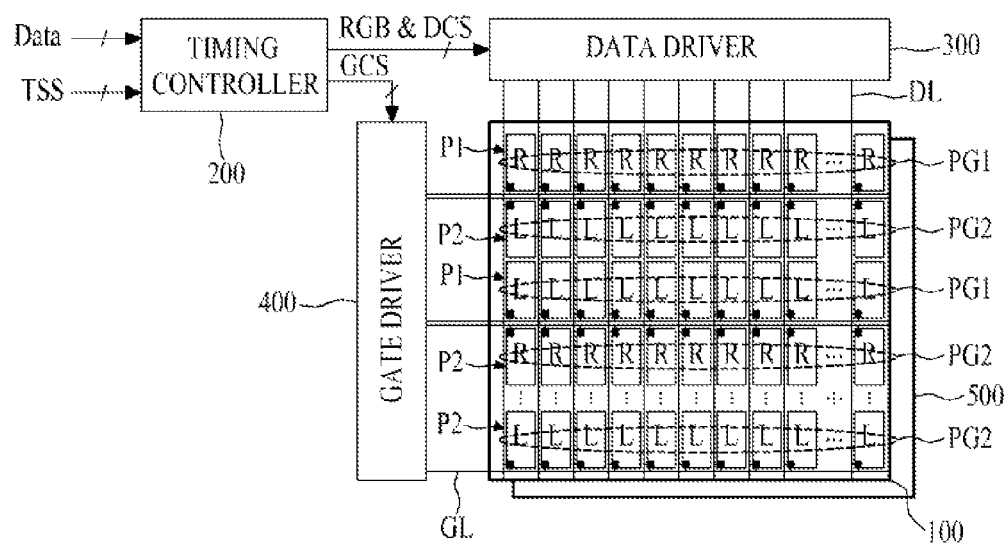
FIG. 6 is a view schematically illustrating a stereoscopic image display device according to an embodiment of the present invention.

FIG. 6 is a view schematically illustrating a stereoscopic image display device according to an embodiment of the present invention.

Referring to FIG. 6, the stereoscopic image display device according to an embodiment of the present invention includes a stereoscopic image display panel 100, a timing controller 200, a data driver 300, a gate driver 400, and a backlight unit 500.

The stereoscopic image display panel 100, as illustrated in FIGS. 1 to 5, includes first and second substrates 110 and 120, first and second polarizers 130 and 140, and first and second light-axis changing members 150R and 150L. The stereoscopic image display panel 100 having such configuration has the same configuration as that of the stereoscopic image display panel 100 in FIGS. 1 and 2, and thus, its detailed description will not be provided and refer to the above-described embodiments. Like reference numerals refer to like elements throughout.

The timing controller 200 generates 3D image data RGB with external input data "Data", and aligns the generated 3D image data RGB in order for different 3D images R and L to be displayed in first and second pixel groups PG1 and PG2. In this case, the timing controller 200 aligns the input data "Data" of 3D video, which is directly inputted from the outside, into the 3D image data RGB.

The timing controller 200 may convert the input data "Data" of 2D video, which is inputted from the outside, into a 3D image and align the converted 3D image into the 3D image data RGB. For this, the timing controller 200 may further include a 2D/3D image converter (not shown) converting a 2D image into a 3D image.

Moreover, the timing controller 200 generates a data control signal DCS for controlling the driving timing of the data driver 300 and a gate control signal GCS for controlling the driving timing of the gate driver 400 by using a timing synch signal TSS that includes an external data enable signal (DE), a dot clock (DCLK), a vertical sync signal (Vsync), and a horizontal synch signal (Hsync). Herein, the data control signal DCS may include a source start pulse, a source sampling clock, a source output enable signal, and a polarity control signal (POL). The gate control signal GCS may include a gate start pulse, and a plurality of gate clock signals.

The data driver 300 generates the 3D image signals R and L corresponding to the aligned 3D image data RGB and supplies the generated 3D image signals to the data lines DL according to the data control signal DCS supplied from the timing controller 200, respectively. That is, the data driver 300 sequentially latches the 3D image data RGB and thereafter converts the latched 3D image data RGB into analog 3D image signals R and L having respective polarities for inversion to supply the analog 3D image signals R and L to the data lines DL, respectively. Herein, the inversion may be a dot inversion or a column inversion, but is not limited thereto. The inversion may be variously set based on image quality, consumption power, the disposition structures of pixels P1 and P2 formed in the stereoscopic image display panel 100, etc.

The gate driver 400 generates a gate signal and supplies the gate signal to the gate lines GL according to the gate control signal GCS supplied from the timing controller 200. In this case, the gate signal may be sequentially supplied to the gate lines GL.

The backlight unit 500 is disposed at a rear surface of the stereoscopic image display panel 100 to irradiate light to the stereoscopic image display panel 100. For this, the backlight unit 500 may include a light source (not shown), and an optical member (not shown).

The light source includes a plurality of lamps or a plurality of light emitting diodes (LEDs). Herein, the light source may be disposed at a side or rear surface of the optical member, based on the structure of the backlight unit 500.

The optical member enhances the brightness characteristic of light inputted from the light source to irradiate the enhanced light to the stereoscopic image display panel 100. For this, the optical member may include a light guide plate and/or a diffusion plate, and a plurality of optical sheets.

As described above, the stereoscopic image display device according to embodiments of the present invention includes the stereoscopic image display panel 100 according to embodiments of the present invention, thereby minimizing the degradation of image quality due to crosstalk between the right image R and the left image L. Thus, the open areas RA and LA are increased, thereby enhancing brightness and an aperture ratio.

In the stereoscopic image display panel and the stereoscopic image display device including the same, according to the above-described embodiments of the present invention, the stereoscopic image display panel 100 has been described above as being a liquid crystal display panel, but is not limited thereto. As another example, the stereoscopic image display panel 100 may be a light emitting display panel including a plurality of light emission pixels that include at least one thin film transistor and light emitting element.

As described above, the stereoscopic image display panel and the stereoscopic image display device including the same, according to the above-described embodiments of the present invention, displays different 3D images in the first and second pixel groups that are formed to be vertically adjacent to each other with two gate lines therebetween, and separates the different 3D images with the third light shield layer having a relatively broader width, thereby minimizing the degradation of image quality due to crosstalk between the right image and the left image.

Moreover, the present invention displays the same 3D image in the first and second pixel groups that are vertically and adjacently formed between two separated gate lines, and separates the same 3D image with the fourth light shield layer having a relatively narrower width, thereby increasing the open areas and thus enhancing brightness and an aperture ratio.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A stereoscopic image display panel comprising:
    a first substrate comprising a plurality of data lines formed at certain intervals apart, a plurality of gate lines formed to intersect the data lines, and first and second pixel groups formed adjacently to each other with two adjacent gate lines therebetween; and
    a second substrate comprising a light shield layer formed at one side and other side of each of the first and second pixel groups to have different overlapped widths, and defining an open area of each of the first and second pixel groups,
    wherein the first and second pixel groups display different stereoscopic images, respectively.

2. The stereoscopic image display panel according to claim 1, wherein the light shield layer comprises:
    a first light shield layer formed to cover an edge of the second substrate;
    a second light shield layer formed to cover the data line;
    a third light shield layer formed to have a first width and cover one side of each of the first and second pixel groups adjacent to the gate line and the two adjacent gate lines; and
    a fourth light shield layer formed in parallel to the third light shield layer to have a second width narrower than the first width, and covering the other side of each of the first and second pixel groups.

3. The stereoscopic image display panel according to claim 1, wherein the stereoscopic image comprises:
    a first image for three-dimension (3D) displayed in one of the first and second pixel groups; and
    a second image for 3D displayed in the other of the first and second pixel groups.

4. The stereoscopic image display panel according to claim 3, wherein the first or second image for 3D is displayed in the first pixel group and the second pixel group formed between two separated gate lines.

5. The stereoscopic image display panel according to claim 3, further comprising:
    a first light-axis changing member formed to comprise a first open area in which the first image for 3D is displayed, and changing an axis of light which passes through the first open area; and
    a second light-axis changing member formed to comprise a second open area in which the second image for 3D is displayed, and changing an axis of light which passes through the second open area.

6. The stereoscopic image display panel according to claim 5, further comprising:
a first polarizer formed at a rear surface of the first substrate; and
a second polarizer formed at a front surface of the second substrate,
wherein the first and second light-axis changing members are formed on the second polarizer.

7. The stereoscopic image display panel according to claim 1, wherein:
the first pixel group comprises a plurality of first pixels connected to the data lines and an odd-numbered gate line of the gate lines, and
each of the first pixels comprises:
a first thin film transistor connected to the odd-numbered gate line and the data lines; and
a first pixel electrode formed to be connected to the first thin film transistor, and overlapped with a color filter.

8. The stereoscopic image display panel according to claim 7, wherein:
the second pixel group comprises a plurality of second pixels connected to the data lines and an even-numbered gate line of the gate lines, and
each of the second pixels comprises:
a second thin film transistor connected to the even-numbered gate line and the data lines; and
a second pixel electrode formed to be connected to the second thin film transistor, and overlapped with a color filter.

9. The stereoscopic image display panel according to claim 8, wherein the first and second thin film transistors are arranged in a zigzag shape, between two adjacent data lines along a longitudinal direction of the data line.

10. A stereoscopic image display device comprising:
a stereoscopic image display panel according to claim 1;
a timing controller generating a stereoscopic image data with an external input data, and aligning the generated stereoscopic image data for different stereoscopic images to be respectively displayed in the first and second pixel groups;
a data driver generating a stereoscopic image signal, corresponding to the aligned stereoscopic image data, to supply the generated signal to the data line according to control of the timing controller; and
a gate driver generating a gate signal to supply the gate signal to the gate line according to control of the timing controller.

11. The stereoscopic image display device according to claim 10, further comprising a backlight unit irradiating light to the stereoscopic image display panel,
wherein the stereoscopic image display panel further comprises a liquid crystal layer formed between the first and second substrates to control transmittance of light irradiated from the backlight unit.

12. The stereoscopic image display device according to claim 10, wherein the light shield layer comprises:
a first light shield layer formed to cover an edge of the second substrate;
a second light shield layer formed to cover the data line;
a third light shield layer formed to have a first width and cover one side of each of the first and second pixel groups adjacent to the gate line and the two adjacent gate lines; and
a fourth light shield layer formed in parallel to the third light shield layer to have a second width narrower than the first width, and covering the other side of each of the first and second pixel groups.

13. The stereoscopic image display device according to claim 10, wherein the stereoscopic image comprises:
a first image for three-dimension (3D) displayed in one of the first and second pixel groups; and
a second image for 3D displayed in the other of the first and second pixel groups.

14. The stereoscopic image display device according to claim 13, wherein the first or second image for 3D is displayed in the first pixel group and the second pixel group formed between two separated gate lines.

15. The stereoscopic image display device according to claim 13, wherein the stereoscopic image display panel further comprises:
a first light-axis changing member formed to comprise a first open area in which the first image for 3D is displayed, and changing an axis of light which passes through the first open area; and
a second light-axis changing member formed to comprise a second open area in which the second image for 3D is displayed, and changing an axis of light which passes through the second open area.

16. The stereoscopic image display device according to claim 15, wherein the stereoscopic image display panel further comprises:
a first polarizer formed at a rear surface of the first substrate; and
a second polarizer formed at a front surface of the second substrate,
wherein the first and second light-axis changing members are formed on the second polarizer.

17. The stereoscopic image display device according to claim 10, wherein:
the first pixel group comprises a plurality of first pixels connected to the data lines and an odd-numbered gate line of the gate lines, and
each of the first pixels comprises:
a first thin film transistor connected to the odd-numbered gate line and the data lines; and
a first pixel electrode formed to be connected to the first thin film transistor, and overlapped with a color filter.

18. The stereoscopic image display device according to claim 17, wherein:
the second pixel group comprises a plurality of second pixels connected to the data lines and an even-numbered gate line of the gate lines, and
each of the second pixels comprises:
a second thin film transistor connected to the even-numbered gate line and the data lines; and
a second pixel electrode formed to be connected to the second thin film transistor, and overlapped with a color filter.

19. The stereoscopic image display device according to claim 18, wherein the first and second thin film transistors are arranged in a zigzag shape, between two adjacent data lines along a longitudinal direction of the data line.

* * * * *